Patented June 12, 1923.

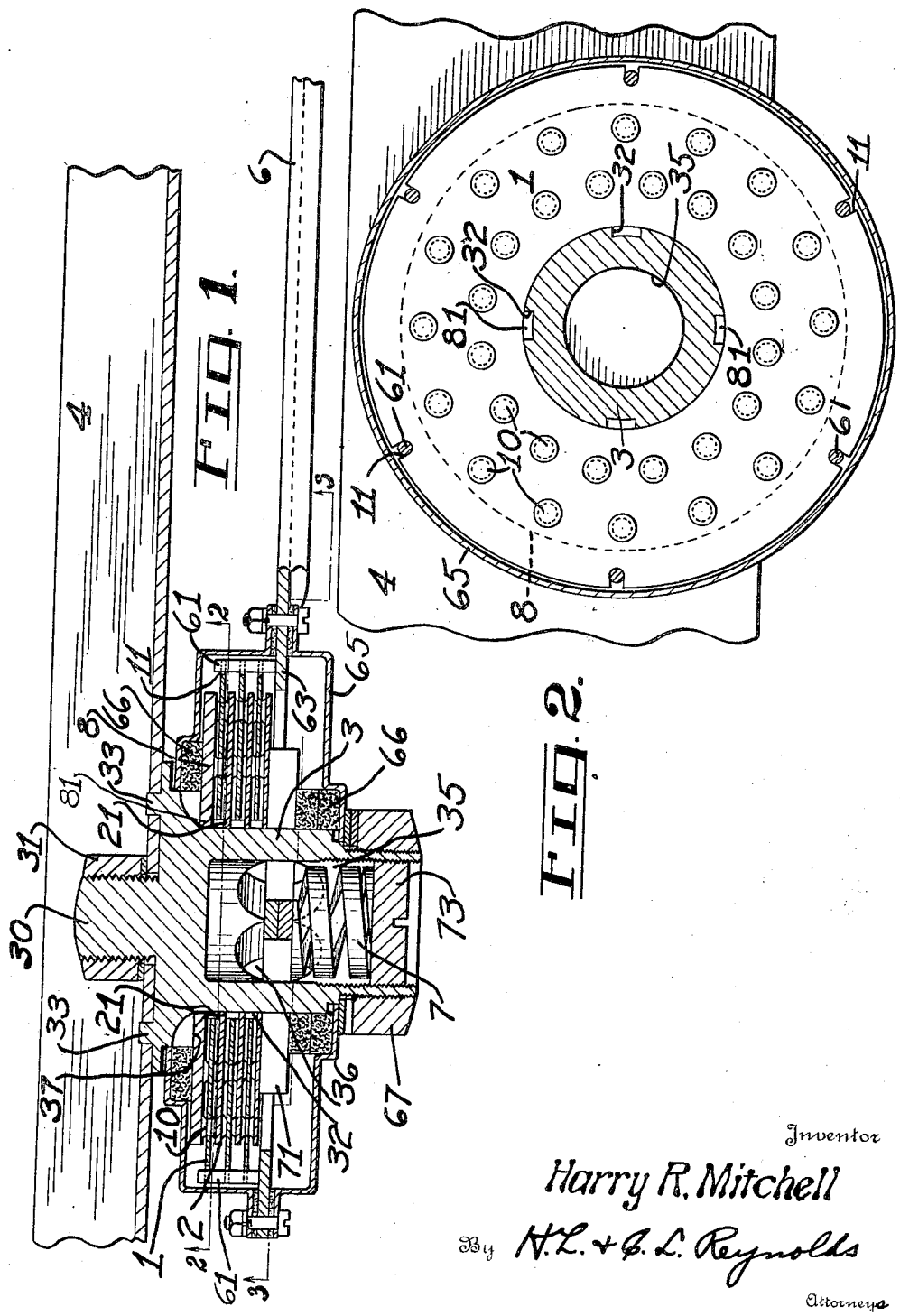

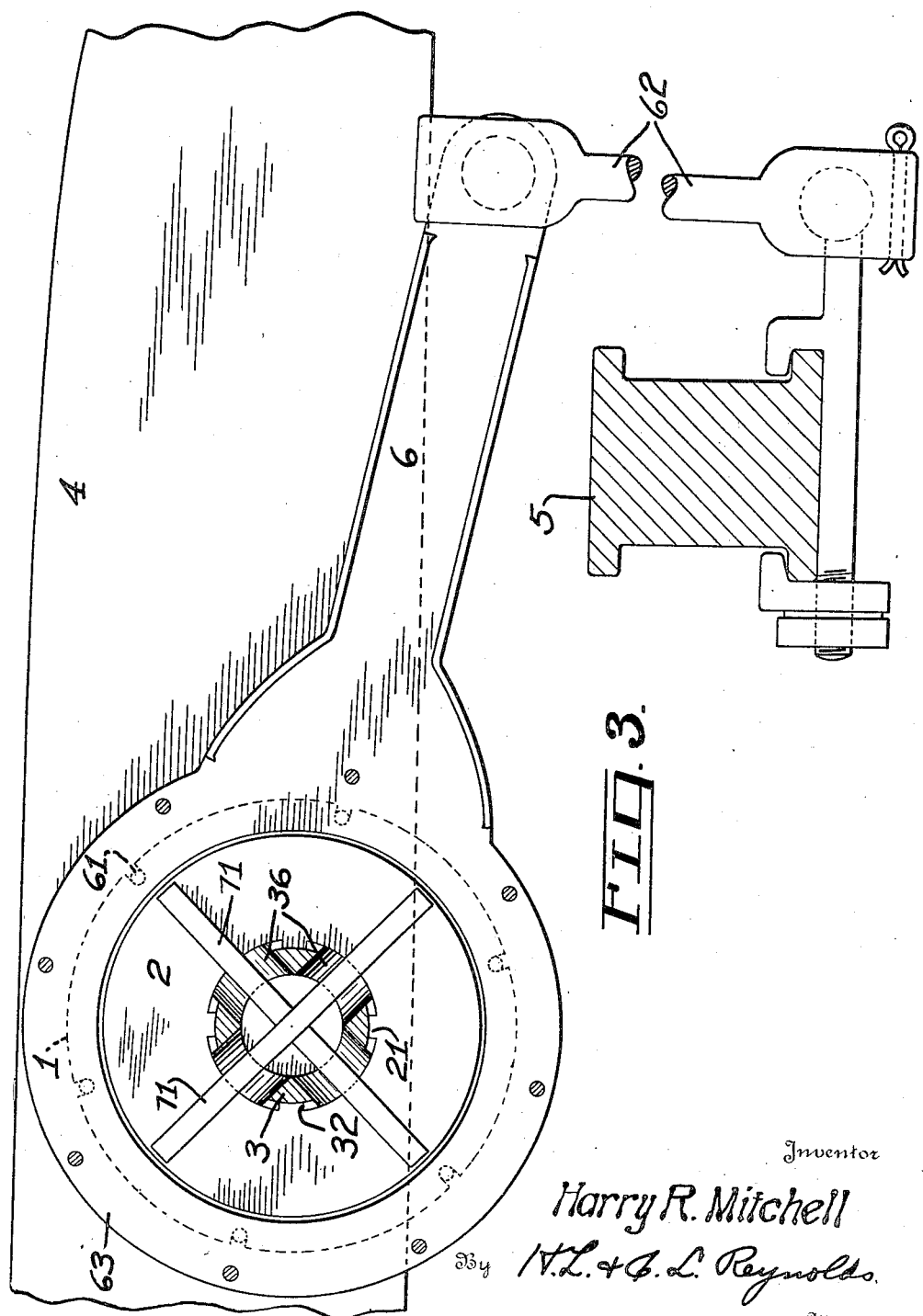

1,458,494

UNITED STATES PATENT OFFICE.

HARRY R. MITCHELL, OF SEATTLE, WASHINGTON, ASSIGNOR TO MITCHELL PRODUCTS COMPANY, OF SEATTLE, WASHINGTON, A CORPORATION OF WASHINGTON.

SHOCK ABSORBER.

Application filed January 25, 1922. Serial No. 531,574.

*To all whom it may concern:*

Be it known that I, HARRY R. MITCHELL, a citizen of the United States of America, and resident of the city of Seattle, in the county of King and State of Washington, have invented certain new and useful Improvements in Shock Absorbers, of which the following is a specification.

My invention relates to shock absorbers of the general type which employ two series of relatively rotative or relatively oscillable friction plates, each series being secured to different and relatively movable vehicle members.

It is an object of my invention to provide such a shock absorber in which the pressure upon the spring which regulates the amount of friction between the plates may be conveniently applied and adjusted.

A further object is to provide such a shock absorber which will be completely encased, enabling it to be run in grease, but in which the tension of the pressure-producing spring may be adjusted independently and externally of the enclosing casing and without removal thereof.

A further object is to provide in a shock absorber means for removing all of the end thrust from the enclosing casing, and placing of all tension upon the friction elements alone.

A further object is to provide a more efficient shock absorber of the friction type, one that will last longer, and one which may be run in grease without detrimentally affecting its resistance to shocks.

Other objects may be ascertained from a study of the following specification and the claims terminating the same, taken in connection with the accompanying drawings, wherein my invention is shown in a form now preferred by me.

My invention comprises those novel parts and combinations thereof which are shown in the accompanying drawings, described in the specification, and particularly defined by the claims terminating the same.

Figure 1 is an axial section through my shock absorber shown attached to a vehicle frame member.

Figures 2 and 3 are transverse sections thereof on lines 2—2 and 3—3 of Figure 1, respectively.

My invention includes two series of friction plates, one series consisting of the plates 1, which may be referred to as the oscillable plates, and the other series comprising plates 2, which may be referred to as fixed plates to distinguish them from the plates 1. One of these series of plates, as the plates 1, are shown as provided with a series of inserted studs 10, which are of a frictional material such as cork, and which form the members which actually bear upon the plates 2. The cork studs may be run for long periods in grease without appreciable wear, and without serious loss of their frictional holding property. Two series of such plates 1 and 2, the plates in the two series alternating, are employed.

The plates 2 are secured in some suitable manner to a hub sleeve 3 to prevent relative rotation therebetween. As shown herein the hub sleeve is provided with external longitudinal grooves 32 in which tongues 21 of the plates 2 are slidably secured. Thus the plates 2 may not turn relative to the hub sleeve 3. The plates 1 are journaled about the hub sleeve 3.

The hub sleeve 3 is securable to a vehicle member such as the frame 4. The securing means which I have shown comprise a threaded trunnion 30, which passes through a hole in the frame 4 and which is secured therein with a suitable nut 31, and a series of smaller trunnions 33 also secured in holes in the frame 4. Any other suitable means may be employed. The trunnions 33 are spaced outward from the axis of the sleeve 3 to prevent its rotation relative to the frame 4.

The series of plates 1 are connected to a vehicle member which is movable relative to the frame 4, as the axle 5. An arm 6 carries a ring 63, which encircles the hub sleeve 3 and in which are secured pins 61. These pins engage in peripheral notches 11 of the plates 1. The outer end of the arm 6 is suitably connected, as through a link 62, to the axle 5. A casing 65 is secured to the arm 6, or to the ring 63. The casing 65 is intended to completely enclose the plates 1 and 2 and is journaled upon the hub sleeve 3. Suitable packing means, such as the felt rings 66, may be employed at the journals of the casing 65 to prevent leakage of oil or grease therefrom. A nut 67 threaded about the free end of the hub sleeve secures the casing 65 in place thereupon, and by screwing up on the nut pressure may be exerted upon the outer side of the casing 65 to compress the rings 66 slightly to prevent leakage of grease.

Means are provided for pressing the plates 1 and 2 closely together, and for varying the friction-producing pressure therebetween. The hub sleeve 3 has an axial bore 35 and has also transversely extending openings 36 which intercept the axial bore 35. A spring 7 is contained within the bore 35 and transmits its pressure to the outermost of the series of friction plates through suitable means, such as the spider 71 which projects through the transverse openings. A nut 73 is threaded in the end of the bore 35, which extends outside of the casing 65, and closes it off. This nut by its adjustment regulates the pressure of the spring 7 upon the friction plates.

It is not desirable that any of the pressure between the friction plates be transmitted to the casing 65, as this tends to deform the casing, to permit leakage about its journals, and requires a considerably heavier casing than is desirable. I have, therefore, provided the hub sleeve 3 with a radially extending flange 37 which forms a shoulder upon which is seated a plate 8. The plate 8 is supported only upon the flange 37 and preferably is somewhat heavier than the friction plates 1 and 2. This plate 8 is not rotative relative to the hub sleeve 3, being held by lugs 81 entering the grooves 32. This plate and the flange 37 form a thrust bearing for one side of the series of friction plates, the opposite thrust bearing being composed of the nut 73. Thus the pressure in each direction is transferred to the hub sleeve itself, and all friction is generated only between the friction disks themselves.

As the operation of the device will be obvious from the above description, I do not deem it necessary to explain the same more fully.

What I claim as my invention is:

1. In a shock absorber, in combination, two series of relatively oscillable friction plates adapted to be connected to relatively movable vehicle parts, a hub sleeve mounted concentrically of said plates, a spring in the axial bore of said hub sleeve operable to press said series of plates together, and a nut threaded in an end of said hub sleeve and adjustable to vary the pressure of said spring.

2. In a shock absorber, in combination, two series of relatively oscillable friction plates, one series adapted to be connected to a vehicle member, a hub adapted to be secured to a relatively movable vehicle member and engageable by the second series of plates, said hub having a radially projecting flange at one end and a central bore, a bearing plate supported only upon said flange and interposed between the flange and the friction plates, and a spring-pressed spider engageable with the opposite side of the two series of friction plates, a spring in the bore of the hub bearing upon said spider and means for adjusting the tension of said spring.

3. In a shock absorber, in combination, a hub adapted to be secured to a vehicle member and axially bored at one end, and having transverse bores intersecting the axial bore, two complemental series of friction plates, one series being fixed to said hub and the other series being oscillable relative to the first series, an arm fixed to the second series and adapted to be secured to a second vehicle member, and a spring-pressed spider mounted in said transverse bores and bearing upon said friction plates.

4. In a shock absorber, in combination, two series of relatively oscillable friction plates, one series adapted to be connected to a vehicle member, a hub adapted to be secured to a relatively movable vehicle member and engageable by the second series of plates, said hub having a radially projecting flange at one end, a bearing plate supported only upon said flange and interposed between the flange and the friction plates, said hub being axially bored at its end opposite said flange, and having transverse openings intersecting said axial bore, a spider passing through the transverse openings and engaging the outermost of the two series of plates opposite said flange and bearing plate, and a spring within said bore operable to press said spider against the adjoining plate.

5. In a shock absorber, in combination, two series of relatively oscillable friction plates, a hub sleeve having the plates of one series connected thereto, and those of the second series journaled thereon, said hub sleeve being adapted for securement to a vehicle member and having an internally threaded bore and an open outer end, a casing adapted to be secured to a relatively movable vehicle member, and having means engageable with said second series of plates upon the hub sleeve and serving to enclose said plates, a spring in the axial bore of said hub sleeve and operable to press said plates together, and an adjusting nut for said spring threaded in the bore of the hub sleeve and accessible through the open outer end thereof.

6. In a shock absorber, in combination, two series of relatively oscillable friction plates, a hub sleeve having the plates of one series connected thereto, and those of the second series journaled thereon, said hub sleeve being adapted for securement to a vehicle member, a casing having two spaced sides adapted to be secured to a relatively movable vehicle member, and having means engageable with said second series of plates upon the hub sleeve and serving to enclose said plates, the two sides of said casing being mounted for oscillation upon the hub sleeve at inner and outer portions thereof, packing elements at the juncture of the sides of the casing and the hub sleeve to constitute grease retaining elements, a pressure exerting means carried by the hub sleeve and acting upon said plates to force them into engagement with each other and means threaded upon the hub sleeve and exerting pressure against the outer side of said casing.

Signed at Seattle, King County, Washington, this 16th day of January, 1922.

HARRY R. MITCHELL.